United States Patent [19]

Kuhnlein

[11] 4,187,904
[45] Feb. 12, 1980

[54] HEAT TRANSFER INSTALLATION HAVING STORAGE RESERVOIR CONTAINING A SALT AS A HEAT CARRIER

[75] Inventor: Hans Kühnlein, Füllinsdorf, Switzerland

[73] Assignee: Hch. Bertrams Aktiengesellschaft, Switzerland

[21] Appl. No.: 845,938

[22] Filed: Oct. 27, 1977

[30] Foreign Application Priority Data

Nov. 2, 1976 [CH] Switzerland ............... 13787/76

[51] Int. Cl.² ............... F28D 13/00; F24H 7/00; F24D 11/00
[52] U.S. Cl. ............... 165/104 S; 126/400; 165/18; 126/430
[58] Field of Search ............... 126/400, 270, 271; 165/104 S, 18, 104 M, 104 R, 104, 70; 237/1 A

[56] References Cited

U.S. PATENT DOCUMENTS

| 3,079,087 | 2/1963 | Herrick | 165/104 S |
| 3,722,445 | 3/1973 | Karig | 165/104 S |
| 3,960,136 | 6/1976 | Moan | 237/1 A |
| 3,973,552 | 8/1976 | Ervin | 126/400 |
| 3,991,936 | 11/1976 | Switzgable | 126/400 |
| 4,010,734 | 3/1977 | Chayet | 237/1 A |

FOREIGN PATENT DOCUMENTS

| 2001863 | 8/1971 | Fed. Rep. of Germany | 126/400 |
| 748264 | 4/1956 | United Kingdom | 165/70 |

Primary Examiner—Ira S. Lazarus
Assistant Examiner—Carl Stuart Miller
Attorney, Agent, or Firm—McGlew and Tuttle

[57] ABSTRACT

The heat transfer apparatus comprises a storage reservoir containing salt as a heat carrier with a heater connected into the reservoir to heat the heat carrier so as to maintain it above the freezing point. The heater may comprise an electric heater or a fluid which is circulated for example from a separate heat exchanger. An intermediate heat exchanger is connected so that the salt is circulated therethrough and in heat transfer relationship to an intermediate heat carrier such as a metal alloy which is circulated from a consumption heat exchanger. The intermediate heat exchanger is in heat exchange relationship with a consumption heat carrier.

9 Claims, 1 Drawing Figure

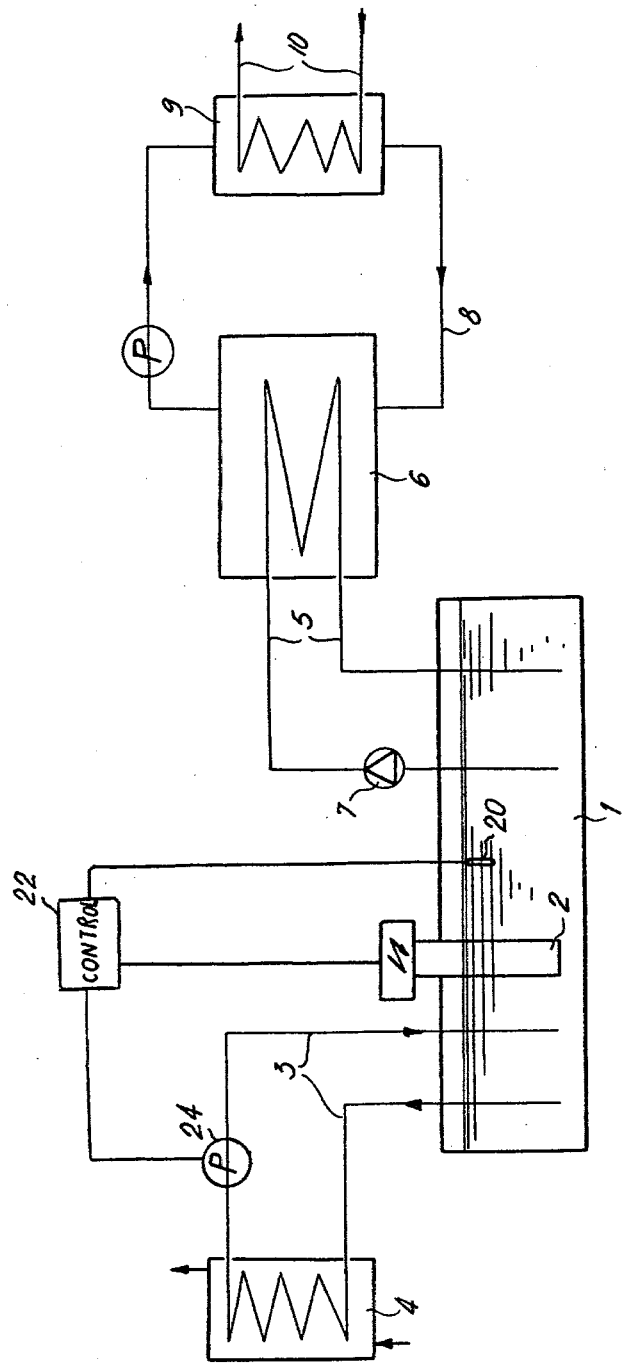

HEAT TRANSFER INSTALLATION HAVING STORAGE RESERVOIR CONTAINING A SALT AS A HEAT CARRIER

BACKGROUND OF THE INVENTION

1. Field of the Invention

The present invention relates to heating devices and in particular to a new and useful heat transfer installation or system with a storage reservoir containing a salt as the heat carrier.

2. Description of the Prior Art

In heat exchange installations, a heat storage reservoir is provided in cases where the amount of heat supply and heat demand differ from each other within a given time. In most instances, the heat energy is available for a shorter period of time, while the heat consumption is more or less continuous. Available sources of heat energy are, for example, night current, solar energy, or heat from industrial processes. As a storage medium, fused salts are provided which are chemically stable even in high temperature ranges.

In prior art installations of this kind, in which fusible salts stable even at high temperatures, i.e. up to about 500° C., are employed as stored heat carriers, it is provided to use the respective available energy for heating up this heat carrier, and the salt is heated, starting from its solid state above the melting point and up to the highest admissible operating temperature, while the removal of heat, for example, by heat exchange to produce hot water for heating or other consumption purposes, by which the heat carrier is cooled down, is continued to below the freezing point of the fused salt. In eutectic compositions, fused salts have a melting point in the range of about 150° C., so that their cooling down, for example, to 120° C. is still quite acceptable, even for producing hot water. This means, however, that between the consecutive heating-up periods, the heat carrying salt must each time pass from its liquid into its solid state (and inversely), which results in uncontrollable mechanical stresses in the storage system.

SUMMARY OF THE INVENTION

The present invention is directed to a heat transfer installation operating with salt as the stored-heat carrier, with means to heat the carrier up to high temperatures, in which the difficulties caused by a periodical freezing of the fused salt cannot arise.

For this purpose, in accordance with the invention, means are provided for preventing the stored-heat carrier from freezing between two consecutive heating periods, so that during operation of the installation, the stored-heat carrier remains in its liquid state of aggregation. This means, it is true, that the heat of fusion liberated during freezing is not available for the heat removal; but, on the other hand, there is no necessity of compensating for this heat by a repeated energy supply between two removal periods. Also, no mechanical loads of the storage system, caused by a change of physical state, can occur, which is of crucial importance in practice.

Since the heat transfer is always effected by heat exchange through suitable contact surfaces with the heat consumption medium, difficulties have been met in respect to the regularly high temperature gradient, particularly with water used as the heat consumption medium. With the present invention, this problem may also be solved, by providing an intermediate heat carrier having a heat transfer connection, through a first heat exchanger, with the flow path of the fused salt and, through at least one second heat exchanger, with the flow path of the consumption medium. In addition there are means for preventing the stored fused salt from freezing which comprises the same means which keep the temperature of the intermediate heat carrier above the freezing point of the fused salt. Advantageously, the first heat exchanger is provided outside a storage tank for the stored-heat carrier. With this design, it is obtained, in addition, that the total temperature difference between the stored-heat carrier and the consumption medium is split up between two heat exchangers which are independent of each other, so that the previously mentioned difficulties can be avoided. A further advantage is that in the heat exchangers provided outside the storage tank, only relatively small heat carrier amounts are opposed to each other, which are separated from each other only by the heat exchange walls. This further contributes to the security of operation and facilitates the control.

Accordingly it is an object of the invention to provide a heat transfer installation which comprises a storage reservoir which contains a salt as a heat carrier and which includes heat supply means connected into the storage reservoir for preventing the stored heat carrier from freezing between two consecutive heating periods so that during operation of the installation the stored heat carrier maintains its liquid state of aggregation.

A further object of the invention is to provide a heat transfer apparatus which comprises a storage reservoir which contains salt as a heat carrier with heater means connected into the reservoir to heat the carrier so as to maintain it above its freezing point and which includes an intermediate heat exchanger with means for circulating salt from the reservoir through the intermediate heat exchanger and a consumption heat exchanger with means for circulating an intermediate heat carrier through the consumptive heat exchanger and said intermediate heat exchanger and further including means for circulating a consumptive heat carrier through the consumptive heat exchanger in heat exchange relationship with the intermediate heat carrier.

A further object of the invention is to provide a heat transfer apparatus which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiment of the invention are illustrated.

BRIEF DESCRIPTION OF THE DRAWING

The only FIGURE of the drawing is a schematic diagram indicating a heat transfer apparatus constructed in accordance with the invention.

GENERAL DESCRIPTION OF THE PREFERRED EMBODIMENT

Referring to the drawings in particular, the invention embodied therein comprises a heat transfer apparatus wherein a storage reservoir 1 containing a salt is employed which is maintained at a temperature above its freezing point.

The drawing shows a storage reservoir 1 which is dimensioned for receiving the entire quantity of a stored-heat carrier. Through the roof or top wall of the reservoir 1, electrical heating elements 2 are introduced into reservoir 1. The stored-heat carrier comprises a salt mixture which is chemically stable even at high temperatures; thus, for example, it is possible to use a eutectic inorganic salt mixture of 40% by weight of sodium nitrite, 7% by weight of sodium nitrate, and 53% by weight of potassium nitrate, which is chemically stable up to about 500° C., and has, in pressureless state, a considerably increased storage capacity as compared, for example, to water as stored-heat carrier.

In addition to the heating elements 2, lines 3 are passed into the reservoir through the top wall thereof, which are connected to a heat exchanger or heat source 4. Through heat exchanger 4, foreign energy, for example, solar energy, heat from industrial processes, or the like, can be supplied to the stored-heat carrier. If, for example, night current is employed as the foreign energy, it may be supplied through heating elements 2; otherwise, these heating elements serve the purpose of initially fusing the salt mixture and/or of maintaining a definite temperature above the freezing point of the mixture. Parts 2, 3 and 4 thus form the energy supply side of the installation.

Sensing means such as a temperature recording device 20 are connected into the salt of the storage reservoir and it is connected to a control 22 for operating a pump 24 or circulating a heating control liquid through the line 3 for maintaining the salt in the reservoir 1 above the freezing temperature. The control 22 may also be used to operate the electric heater 2 for regulating the temperature of the salt in the storage reservoir.

Also passed through the top wall of the storage reservoir 1 are lines 5 which lead to an intermediate heat exchanger 6 and are equipped with a pump 7 for feeding the stored fused salt. This intermediate heat exchanger 6 is connected into the flow path 8 of an intermediate heat carrier which, in turn, has a heat transfer connection, through one or more consumption heat exchangers 9, with the consumption heat carrier, for example, hot water or steam, circulated in a line 10. As the intermediate heat carrier, advantageously, a medium is used which is neutral both to the fused salt and to the consumption heat carrier. This may be, for example, a metal alloy containing Pb, Bi Cd, Sn, or the like; but also gases for example air, or water, steam or a salt solution may be used as intermediate heat carriers.

The salt mixture filled into the storage reservoir is initially, for example, by means of heating elements 2, converted by heating from its solid state into its liquid state. During the entire operation of the installation, the fused salt is maintained in its liquid state; thus, only the latent heat of the liquid, but not the heat of fusion, is used as stored energy.

The further heating of the fused salt can be affected with the available source of energy. If, for example, the installation is intended for night current, electrical heating elements 2 may be used for the heating. These heating elements are mounted in the storage reservoir in vertical position. This vertical position makes it possible to pass the leads through the reservoir wall above the salt level. Should the installation be heated, for example, with solar energy or heat from industrial processes, the further heating is effected through heat exchanger 4 which is provided outside storage reservoir 1.

For heat removal, the heated fused salt is fed, by circulating pump 7, into intermediate heat exchanger 6 where it heats the intermediate heat carrier. The intermediate heat carrier is kept at a temperature level which is above the freezing point of the fused salt, so that under any operational conditions, a freezing of the fused salt is prevented.

While a specific embodiment of the invention has been shown and described in detail to illustrate the application of the principles of the invention, it will be understood that the invention may be embodied otherwise without departing from such principles.

What is claimed is:

1. A heat transfer apparatus, comprising a storage reservoir, salt heat carrier disposed in said reservoir, heater means connected into said reservoir to heat said salt heat carrier so as to maintain it above its freezing point, a remote intermediate heat exchanger, means for circulating said salt heat carrier from said reservoir through said intermediate heat exchanger, intermediate heat carrier disposed in said intermediate heat exchanger, a remote consumptive heat exchanger, means for circulating said intermediate heat carrier through said consumptive heat exchanger and through said intermediate exchanger in heat exchange relationship with said salt heat carrier, a consumptive heat carrier disposed in said consumptive heat exchanger, and means for circulating a consumptive heat carrier through said consumptive heat exchanger in heat exchange relationship with said intermediate carrier.

2. A heat transfer apparatus according to claim 1, wherein said heater means maintains said heat carrier salt at a temperature to maintain said intermediate heat carrier above the freezing point of said salt heat carrier.

3. A device according to claim 1, wherein said intermediate heat exchanger is located outside of said storage reservoir.

4. A heat transfer apparatus according to claim 1, wherein said storage reservoir has a top wall, said heat means including a connection into said top wall of said reservoir and into the salt heat carrier contained therein.

5. A heat transfer apparatus according to claim 1, wherein said heat carrier is a eutectic, inorganic salt mixture comprising 40% by weight of sodium nitrite, 7% by weight of sodium nitrate and 53% of potassium nitrate.

6. A heat transfer device according to claim 1, wherein said intermediate heat carrier comprises material selected from the group consisting of a metal alloy, a gas air, steam, water, and a salt solution which is chemically neutral to both the stored heat carrier and the consumption heat carrier.

7. A heat transfer system comprising an intermittently operating heat source, a storage reservoir remotely disposed from said heat source, a supply of a salt heat carrier contained in said storage reservoir, means for circulating said salt heat carrier between said heat source and said remotely disposed storage reservoir, a secondary heat source connected to said storage reservoir for preventing the salt heat carrier therein freezing during the interval between successive intermittent operating intervals of said heat source, an intermediate heat exchanger remotely disposed from said storage reservoir, an intermediate heat carrier disposed in said intermediate heat exchanger, means for circulating said salt heat carrier between said storage reservoir and said intermediate heat exchanger to effect an indirect exchange of heat between said salt heat carrier and said intermediate heat carrier, a consumptive heat exchanger remotely disposed from said intermediate heat exchanger, means for circulating a consumptive heat carrier through said consumptive heat exchanger, means interconnecting said intermediate heat exchanger and consumptive heat exchanger for circulating said intermediate heat carrier into heat transfer relation with said consumptive heat carrier.

8. A heat transfer installation as defined in claim 7, and including a contact means responsive to the temperature of said salt heat carrier in said reservoir for activating said secondary heat source.

9. A heat transfer installation as defined in claim 8, and including salt heat carrier circulating means including a pump, and said pump being operatively connected to said control means to regulate the circulation of said salt heat carrier between said reservoir and said heat source.

* * * * *